United States Patent
Phonsa et al.

(10) Patent No.: US 9,660,960 B2
(45) Date of Patent: May 23, 2017

(54) REAL-TIME RECONFIGURABLE WEB APPLICATION FIREWALL FOR A DISTRIBUTED PLATFORM

(71) Applicant: Verizon Digital Media Services Inc., Playa Vista, CA (US)

(72) Inventors: Vikas Phonsa, Santa Monica, CA (US); Hayes Kim, Northridge, CA (US); David Andrews, Los Angeles, CA (US)

(73) Assignee: Verizon Digital Media Services Inc., Playa Vista, CA (US)

( * ) Notice: Subject to any disclaimer, the term of this patent is extended or adjusted under 35 U.S.C. 154(b) by 0 days.

(21) Appl. No.: 15/242,859

(22) Filed: Aug. 22, 2016

(65) Prior Publication Data

US 2016/0359809 A1 Dec. 8, 2016

Related U.S. Application Data

(63) Continuation of application No. 14/579,372, filed on Dec. 22, 2014, now Pat. No. 9,426,125.

(51) Int. Cl.
*H04L 29/00* (2006.01)
*H04L 29/06* (2006.01)

(52) U.S. Cl.
CPC ...... *H04L 63/0263* (2013.01); *H04L 63/0218* (2013.01); *H04L 63/1433* (2013.01)

(58) Field of Classification Search
CPC .................................. G06F 21/00; H04L 9/32
USPC .......................................................... 726/11
See application file for complete search history.

(56) References Cited

U.S. PATENT DOCUMENTS

| 6,400,707 B1* | 6/2002 | Baum ....................... H04J 1/12 348/E7.07 |
| 8,458,769 B2* | 6/2013 | Dilley ................. H04L 63/0218 726/11 |
| 2010/0043068 A1 | 2/2010 | Varadhan |
| 2013/0298182 A1 | 11/2013 | May |

* cited by examiner

*Primary Examiner* — Anthony Brown
*Assistant Examiner* — Michael D Anderson
(74) *Attorney, Agent, or Firm* — Los Angeles Patent Group; Arman Katiraei (57) ABSTRACT

Some embodiments provide reconfigurable web application firewall (WAF) functionality across a distributed platform. Specifically, the WAF function at each distributed platform server is customizable on a per customer and per inbound message basis. When a server receives an inbound message, the server identifies the content or services of which specific customer are implicated by the inbound message. The server screens the inbound message for attacks using a first set of rules and policies defined as part of a production profile from a WAF instance defined by the specific customer while contemporaneously testing the inbound message against a second set of rules and polices defined as part of an audit profile from the same WAF instance. In this manner, the specific customer tests the audit profile rules and policies while still receiving the protections of the production profile rules and policies.

19 Claims, 9 Drawing Sheets

| Rule ID | Description | Action |
|---|---|---|
| 958000 | Cross-site Scripting (CSS) Attack | |
| 958001 | Cross-site Scripting (CSS) Attack | |
| 958002 | Cross-site Scripting (CSS) Attack | |
| 958003 | Cross-site Scripting (CSS) Attack | |
| 958004 | Cross-site Scripting (CSS) Attack | |
| 958005 | Cross-site Scripting (CSS) Attack | |
| 958006 | Cross-site Scripting (CSS) Attack | |
| 958007 | Cross-site Scripting (CSS) Attack | |
| 958008 | Cross-site Scripting (CSS) Attack | |
| 958009 | Cross-site Scripting (CSS) Attack | |

REAL-TIME RECONFIGURABLE WEB APPLICATION FIREWALL FOR A DISTRIBUTED PLATFORM

CLAIM OF BENEFIT TO RELATED APPLICATIONS

This application is a continuation of U.S. nonprovisional application Ser. No. 14/579,372 entitled "Real-Time Reconfigurable Web Application Firewall For a Distributed Platform", filed Dec. 22, 2014. The contents of application Ser. No. 14/579,372 are hereby incorporated by reference.

BACKGROUND INFORMATION

Network accessible sites and providers of online services and content are often subjected to malicious attacks. These attacks attempt to compromise confidentiality, integrity, and availability of the site, service, or content. Attacks can be conducted in any number of ways. Structured query language (SQL) injections, server-side scripting, and application layer or distributed denial of service (DDOS) are examples of a small set of attack methodologies.

Firewalls have proven to be effective defenses to many such attacks. A firewall can be a hardware or software based security solution. The firewall can be configured with white-lists, black-lists, rules, and policies that detect potentially malicious data traffic from acceptable data traffic. The firewall can also be configured to restrict detected malicious data traffic from entering or exiting a network or provide alerts to notify an administrator of an attack.

Figure 1:
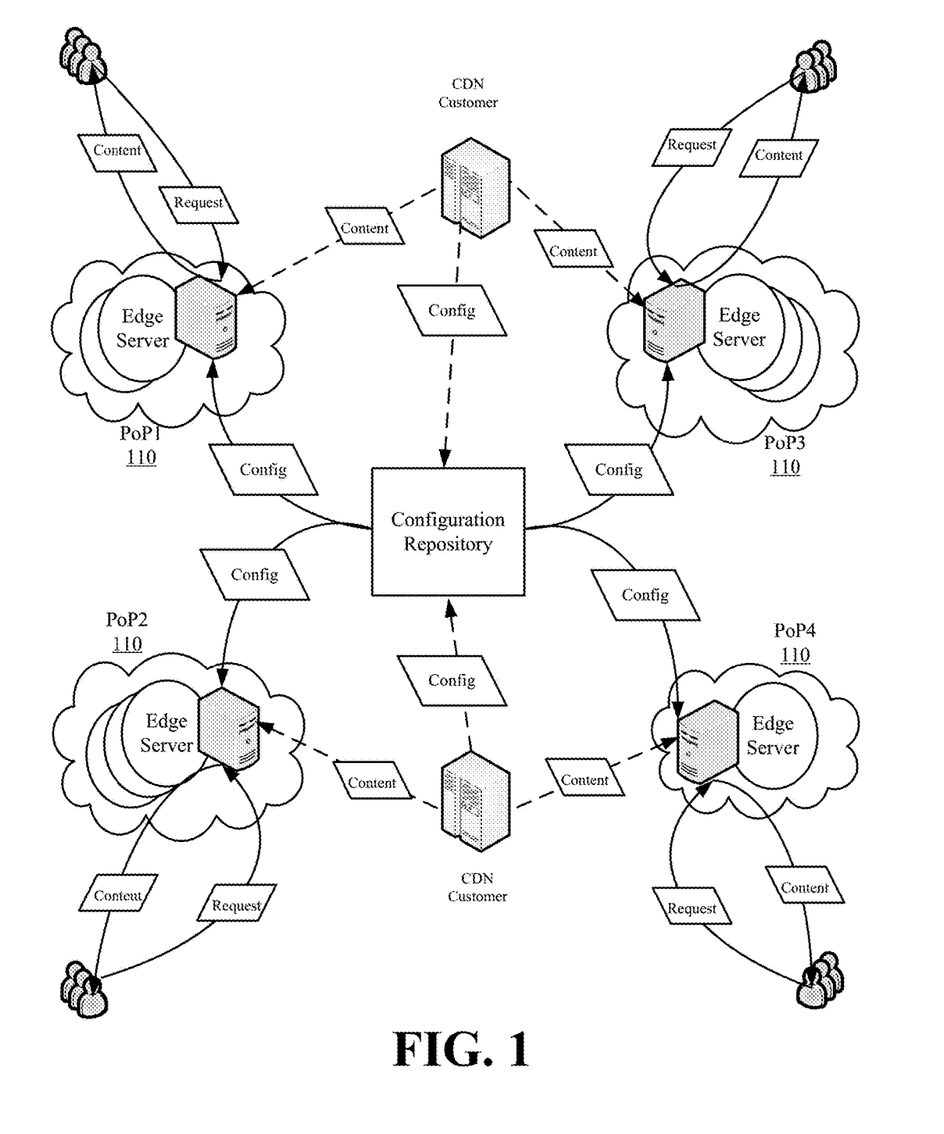
FIG. 1 presents an exemplary distributed platform architecture operating as a CDN.

However, many sites and service providers now offload the delivery of their content and services to a distributed platform, such as a content delivery network (CDN). FIG. 1 presents an exemplary distributed platform architecture operating as a CDN. The CDN operates edge servers at different points-of-presence (PoPs) 110 that are often located at different edges of the Internet or other large network infrastructure. The PoPs 110 are geographically separated from one another. Customers including network site operators, content providers, and service providers interface with the CDN in order to specify configurations for the content and services they want to offload to the CDN for delivery. The CDN passes the customer configurations to the PoP 110 servers. In response, the PoP 110 servers obtain the customer content and services and deliver those content and services on behalf of the customers to users in an optimized manner. Specifically, the servers of each PoP 110 optimally serve the customer content and services to a set of users that are geographically proximate to that PoP 110. Each PoP 110 further provides redundancy to accommodate demand spikes and failover to provide continuous service in the event of equipment or network failure.

In terms of protecting and insulating customers from malicious attacks, the CDN (i.e., distributed platform) faces many challenges. The first challenge is that an attack can be launched against any customer at any of the PoPs 110. Firewall protection is therefore needed at each of the PoPs 110. The second challenge is that each PoP 110 simultaneously hosts and serves content and services of several different customers. A one-size-fits-all firewall solution applying the same white-lists, black-lists, rules, and policies for all customers is impractical and sub-optimal for customers. Different customers will offer different content and services from the same PoPs 110. Typically, these customers will have differing requirements as to what is acceptable data that should be allowed through the CDN firewall and what is potentially malicious data that should be restricted at the CDN firewall. Moreover, different customers may want to handle malicious data differently.

Accordingly, there is a need for a distributed platform web application firewall that insulates customer content and services from malicious attacks at each distributed platform PoP. There is further a need for each PoP to simultaneously support multiple firewall instances with each firewall instance providing different protections for different distributed platform customers. In other words, there is a need to allow each distributed platform customer the ability to configure its own protections and have the distributed platform enforce the protections configured by each customer independently. There is further a need to allow customers to test new protections without compromising existing protections that they have already configured.

BRIEF DESCRIPTION OF THE DRAWINGS

A preferred embodiment for a real-time reconfigurable web application firewall for a distributed platform will now be described, by way of example only, with reference to the accompanying drawings in which.

DETAILED DESCRIPTION OF PREFERRED EMBODIMENTS

Some embodiments provide a real-time reconfigurable web application firewall (WAF) for a distributed platform. The distributed platform WAF secures assets, including content and services, of a plurality of different distributed platform customers at each of a plurality of points-of-presence (PoPs) from which the distributed platform makes the customers' assets available for external or outside consumption. The distributed platform WAF protections are customized on a per customer basis. Accordingly, when any distributed platform PoP server receives an inbound message that is directed to a particular customer's content or services, that server screens the inbound message against rules and policies from a customer specific WAF instance that is defined by the implicated particular customer.

The protections provided by each customer specific WAF instance are reconfigurable in a real-time basis, thereby allowing customers to immediately respond and address security shortfalls. A customer can define multiple profiles that the user can then enable or disable in a real-time basis as part of the customer WAF instance that the distributed platform uses to secure assets of that customer across the distributed platform PoPs. Each profile defines a different set of firewall rules and policies for identifying attacks embedded or passed as part of inbound messages passing to the distributed platform. As part of the customer specific WAF instance, the customer enables a first defined profile as a "production profile" and a second defined profile as an "audit profile". The distributed platform simultaneously executes the designated production profile and the designated audit profile from a customer WAF instance against the same set of inbound traffic. In simultaneously executing the production profile and audit profile enabled as part of a particular customer WAF instance, the distributed platform safeguards the particular customer's assets using the production profile set of rules and policies while contemporaneously testing the audit profile rules and policies without disabling or otherwise lifting any of the production profile protections. At any time, the user can switch between the production profile and the audit profile or select other profiles as the production and audit profiles with the changes propagating to the distributed platform PoP servers in a real-time basis.

In some embodiments, the WAF operation defined by the various customer WAF instances is incorporated as part of the content or service delivery function of each distributed platform PoP server. Consequently, the servers perform the dual function of providing firewall protections while also serving customer assets.

In some such embodiments, the servers derive their content or service delivery operation from an operational configuration. The operational configuration defines the caching policies, eviction policies, and optimizations, among other content or service delivery operational controls, that a server of the distributed platform implements. In some embodiments, each customer defined WAF instance is entered into the server operational configuration under a customer specific heading.

When a server identifies inbound traffic or messaging that is directed to a particular customer, the server queries its operational configuration to identify if a WAF instance has been created by that particular customer. If not, the server passes the traffic through without any protections. If a WAF instance has been created, the server enforces the protections that the particular customer configured as part of the particular customer's WAF instance production profile while also testing the inbound traffic against any rules and policies defined as part of the particular customer's WAF instance audit profile.

Figure 2:
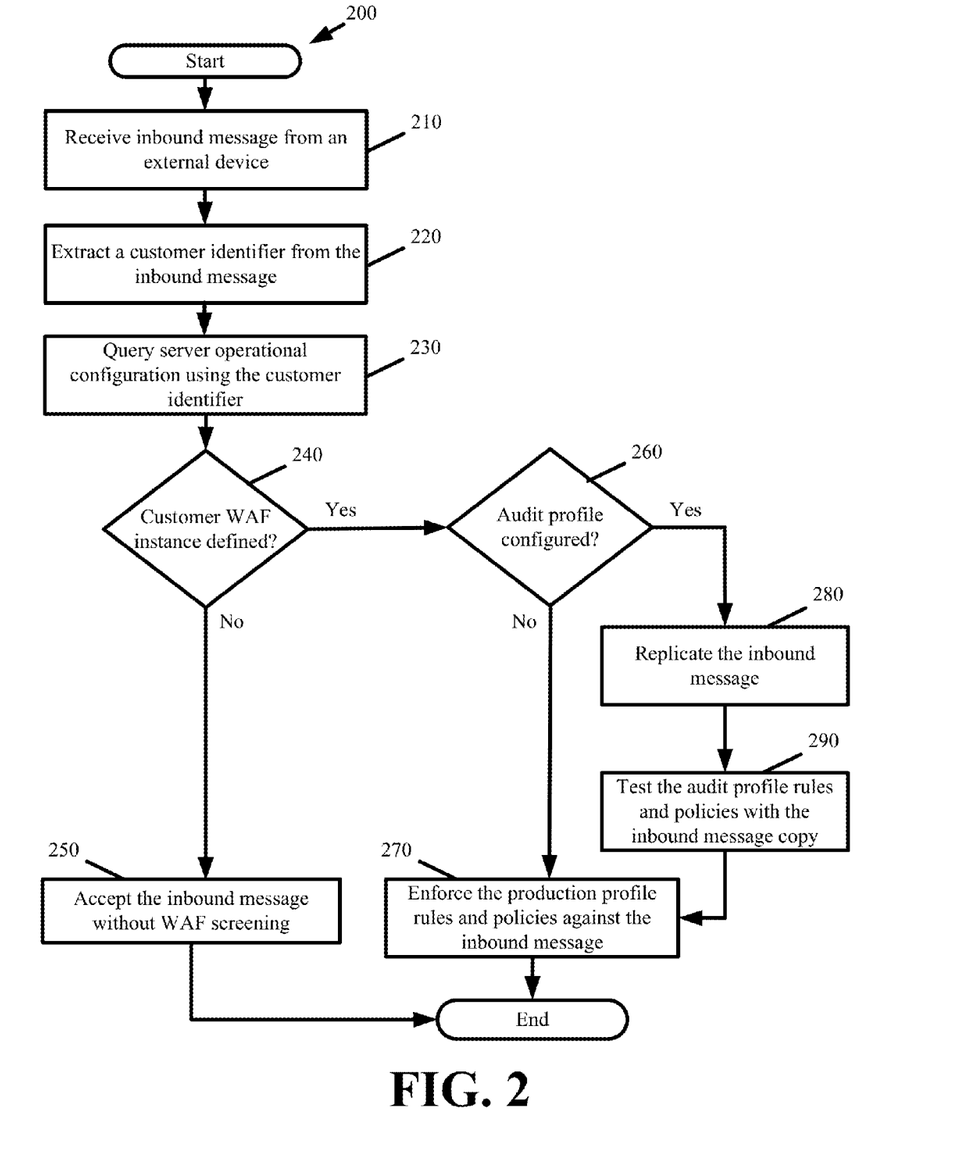
FIG. 2 presents a process performed by a distributed platform PoP server for protecting assets of a particular customer according to one or more WAF instances that the particular customer has specified and that have been entered to the server's operational configuration in accordance with some embodiments.

FIG. 2 presents a process 200 performed by a distributed platform PoP server for protecting assets of a particular customer according to a customer WAF instance that the particular customer has defined and that has been entered to the server's operational configuration in accordance with some embodiments. The process 200 commences with the server receiving (at 210) an inbound message from an external device. In some embodiments, the inbound message is any application layer message. For example, the inbound message can be a HyperText Transfer Protocol (HTTP) or HTTP secure (HTTPS) message used in requesting a service or content from the distributed platform. A malicious attack can be embedded in the header, payload, or metadata of the inbound message.

To secure the inbound message, the process identifies the proper customer WAF instance to screen the inbound message. In order to identify the proper customer WAF instance, the process 200 analyzes and extracts (at 220) a customer identifier from the inbound message. The customer identifier identifies a distributed platform customer whose assets are targeted by the inbound message. In some embodiments, the customer identifier is identified from a Uniform Resource Locator (URL) of the inbound message. In some such embodiments, the customer identifier may be a value that is included as part of the URL path or an argument provided as part of a URL query string. In some embodiments, the customer identifier is identified from the content or service targeted by the inbound message. Certain filenames, script names, or application names can uniquely link to and identify specific customers. In some embodiments, the customer identifier is determined from the header fields or payload of the inbound message.

The process queries (at 230) its operational configuration using the customer identifier. The query result identifies (at 240) whether the distributed platform customer has defined a customer WAF instance to protect its assets. In some embodiments, the query involves matching the customer identifier extracted from the inbound message to a customer identifier entry within the server operational configuration.

If a matching entry is not found in the server operational configuration, the process accepts (at 250) the inbound message, in which case it is passed to or further processed by a PoP server. In some embodiments, the system provides a basic set of protections for all users even when a matching entry is not found in the server operational configuration. In such cases, the process screens the inbound message using a set of system specified firewall rules and policies.

If a matching entry is found in the server operational configuration, the process determines (at 260) if an audit profile has been defined in addition to a production profile. If only a production profile is specified, the process screens (at 270) the inbound message for any embedded attacks using the production profile rules and policies. Should the inbound message contain an attack that is identified by one or more of the production profile rules or policies, the process performs an action. The action includes generating an alert or logging the violation. The alert can identify any of the detected attack, the inbound message containing the attack, and the one or more rules or policies used in identifying the attack. Additionally, the action can include blocking the inbound message from further processing. The action may be specified for the production profile as a whole or specifically for the violated rule or policy such that different violated rules or policies cause the server to perform different actions. If an audit profile is specified in addition to the production profile, the process replicates (at 280) the inbound message and tests (at 290) the audit profile rules and policies with the inbound message copy while contemporaneously protecting the customer's assets by enforcing (at 270) the production profile rules and policies against the original inbound message. Should the inbound message violate any of the audit profile rules or policies, the process provides an alert to notify the customer or security administrator. Alerts can be presented through a network accessible interface (i.e., dashboard) or other forms of communication including email, text message, instant message, etc.

Figure 3:
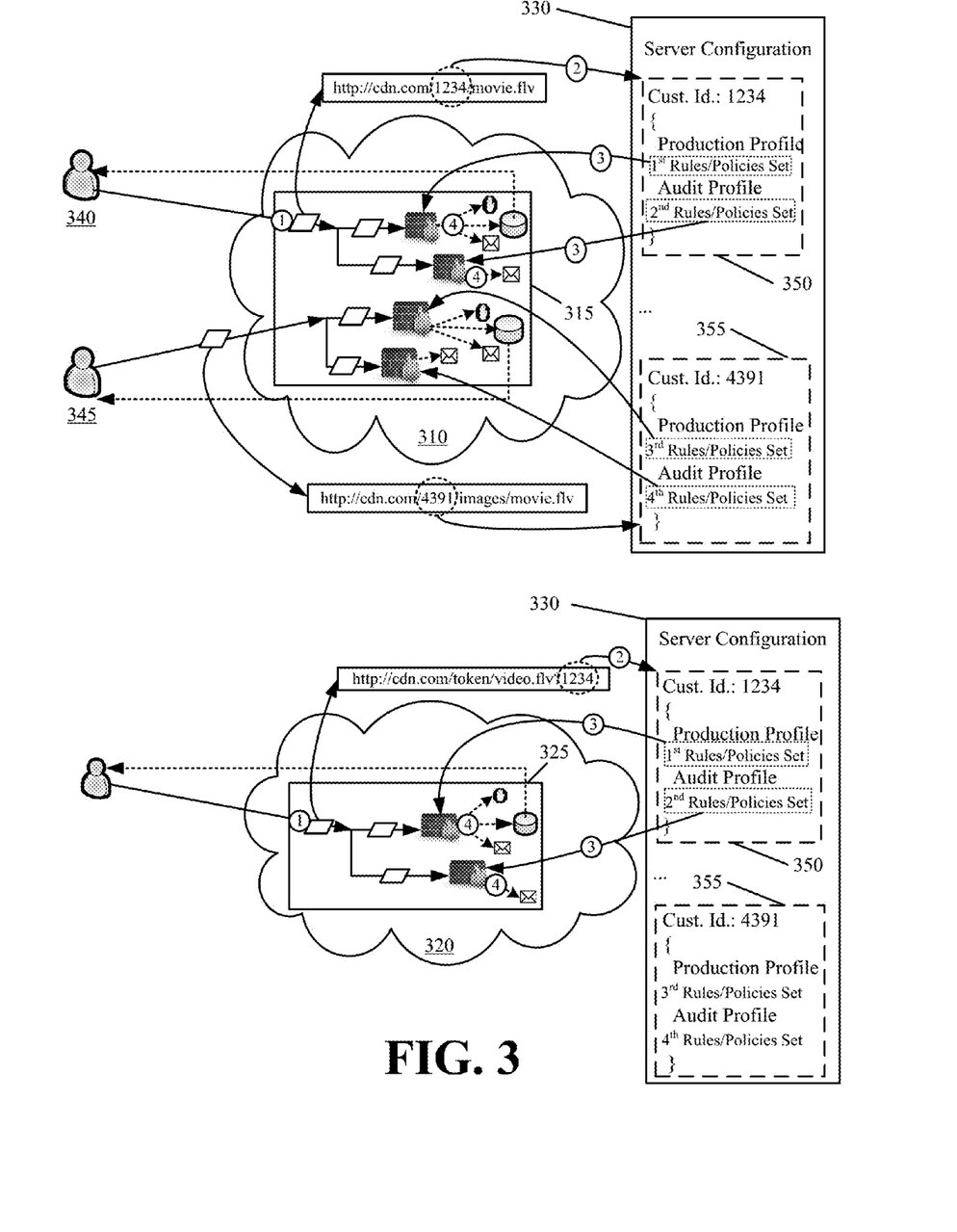
FIG. 3 conceptually illustrates enforcing different customer WAF instances across a distributed platform in accordance with some embodiments.

FIG. 3 conceptually illustrates enforcing different customer WAF instances across a distributed platform in accordance with some embodiments. The figure illustrates a distributed platform architecture having at least two PoPs 310 and 320 at two geographic regions. Each PoP 310 and 320 is shown with at least one server 315 and 325. Each PoP server 315 and 325 operates according to an operational configuration 330. The operational configuration 330 is modified to include at least two customer WAF instances 350 and 355. Each customer WAF instance 350 and 355 is defined with a production profile and an audit profile. Customer WAF instance 350 is defined to protect assets of a first distributed platform customer from attacks defined according to the customer WAF instance 350 production profile rules and policies. Customer WAF instance 355 is defined to protect assets of a second distributed platform customer from attacks defined according to the customer WAF instance 355 production profile rules and policies. The audit profile of each of the WAF instances 350 and 355 define additional rules and policies that the corresponding customer wants to test contemporaneously with the production profile rules and policies.

PoP server 315 is shown to receive a first inbound message from a first user 340 and a second inbound message from a second user 345. The PoP server 315 determines that the first inbound message targets assets of a first distributed platform customer and that the second inbound message targets assets of a second distributed platform customer. The PoP server 315 then queries its operational configuration 330 to identify that customer WAF instance 350 includes rules and policies of a production profile that specify firewall protections for the first distributed platform customer assets and that customer WAF instance 355 includes rules and policies of a production profile that specify firewall protections for the second distributed platform customer assets. As noted above, this identification can be performed by matching the customer identifier from each inbound message to a corresponding customer identifier identifying a customer WAF instance in the operational configuration 330.

The PoP server 315 secures the first inbound message by identifying any attacks therein using the firewall rules and policies from the first customer WAF instance 350 production profile while using a copy of the same first inbound message to test rules and policies of the first customer WAF instance 350 audit profile. Similarly, the PoP server 315 secures the second inbound message by identifying any attacks therein using the firewall rules and policies from the second customer WAF instance 355 production profile while using a copy of the same second inbound message to test rules and policies of the second customer WAF instance 355 audit profile. As described above, the audit profiles provide each of the customers a means with which to test new rules and policies against actual production traffic without lifting the protections provided by rules and policies of the production profiles.

Depending on the defined rules and policies, securing the messages may include performing any of protocol validation, malicious client identification, generic attack signature identification, known vulnerabilities signature identification, Trojan or backdoor access identification, virus signature identification, or denial of service attacks detection. Additionally or alternatively, the rules and policies can establish traffic restrictions to block traffic by Internet Protocol (IP) address, country, Uniform Resource Locator (URL), and/or referrer.

The production profiles further specify proactive or reactive actions that the server performs upon detecting a malicious attack. Proactive actions can include blocking or restricting an inbound message that contains a potentially malicious attack as a result of violating one of the production profile rules or policies. Reactive actions can include issuing an alert to the customer or an administrator when the inbound message contains a potentially malicious attack as a result of violating one of the production profile rules or policies. As the audit profiles are used in testing new firewall rules and policies and not the active protection of customer assets, the audit profiles do not define any proactive actions. Instead, the audit profiles define various reactive actions that the server performs when an audit profile rule or policy is violated.

In summary, the same PoP server 315 enforces different firewall protections for two inbound messages according to which distributed platform customer assets each inbound message targets. Moreover, the PoP server 315 tests the rules and policies of the first customer WAF instance 350 audit profile while contemporaneously protecting the first customer's assets with the rules and policies of the first customer WAF instance 350 production profile. Similarly, the PoP server 315 tests the rules and policies of the second customer WAF instance 355 audit profile while contemporaneously protecting the second customer's assets with the rules and policies of the second WAF instance 355 production profile.

The same production and audit profiles rules and policies are also enforced by servers at the other distributed platform PoP 320. Accordingly, the first and second distributed platform customers need only specify their customer WAF instances once. The distributed platform automatically incorporates those WAF instances to the operational configurations of the distributed platform servers and automatically deploys those operational configurations to the distributed platform servers.

In some embodiments, the distributed platform includes a WAF security operations center (SOC) with which customers can define and configure their WAF instances and also view the performance of their WAF instances including any alerts that were triggered. In some such embodiments, the WAF SOC provides an online interactive portal for customers to specify their WAF instances. A specific customer logs in to the portal. Once logged in, the customer can define the rules and policies for identifying various attacks, associate the defined rules and policies to one or more profiles, and enable a first profile as the customer WAF instance production profile and a second profile as the customer WAF instance audit profile.

Customer created WAF instances are passed to a distributed platform configuration repository along with an identifier for the customer that created the WAF instance. Upon receiving a customer created WAF instance and customer identifier, the configuration repository updates the operational configurations of the PoP servers to incorporate the customer created WAF instance. Specifically, the configuration repository retrieves the operational configurations for the servers. Each operational configuration is then scanned to determine if a WAF instance entry already exists for the customer. If so, the entry is either replaced or updated with the newly created WAF instance. Otherwise, the configuration repository creates a new WAF instance entry for the customer under a customer specific heading within the operational configuration. The updated operational configuration is then stored back to the configuration repository.

The configuration repository facilitates the real-time deployment of the customer WAF instances to the distributed platform PoP servers for enforcement. In some embodiments, the PoP servers are configured to periodically check the repository for updates to their respective operational configurations. The checks can be performed on a timed based (e.g., every minute) or whenever resource usage of the server drops below a certain threshold. Alternatively, the repository can be configured to push updated configurations to the servers. The repository can push the configurations to the appropriate set of servers whenever the configurations are updated or on a periodic basis. As soon as a server receives a configuration with a new or updated customer WAF instance, the server begins to enforce the rules and policies associated with the customer WAF instance production profile. In this manner, the distributed platform reconfigures the customer firewall protections in real-time.

In some embodiments, the configuration repository can also enter global rules or policies to all customer WAF instances, thereby ensuring that these global rules or policies are enforced for all distributed platform customers. Global rules or policies may be issued when a new attack that is unknown to many customers is detected or when an attack affects a large number of distributed platform customers. The global rules or policies temporarily protect customers from the attacks until the customers can formulate their own response strategy. Accordingly, a global rule or policy can be enforced for all customers for some period of time or while the attack is ongoing. Thereafter, the global rule or policy can be removed from the customer WAF instances and customers can define their own protections against the attack if desired. Alerts can be issued in conjunction with a global rule or policy to notify the customers of the attack and automated action taken by the distributed platform.

Figure 4:
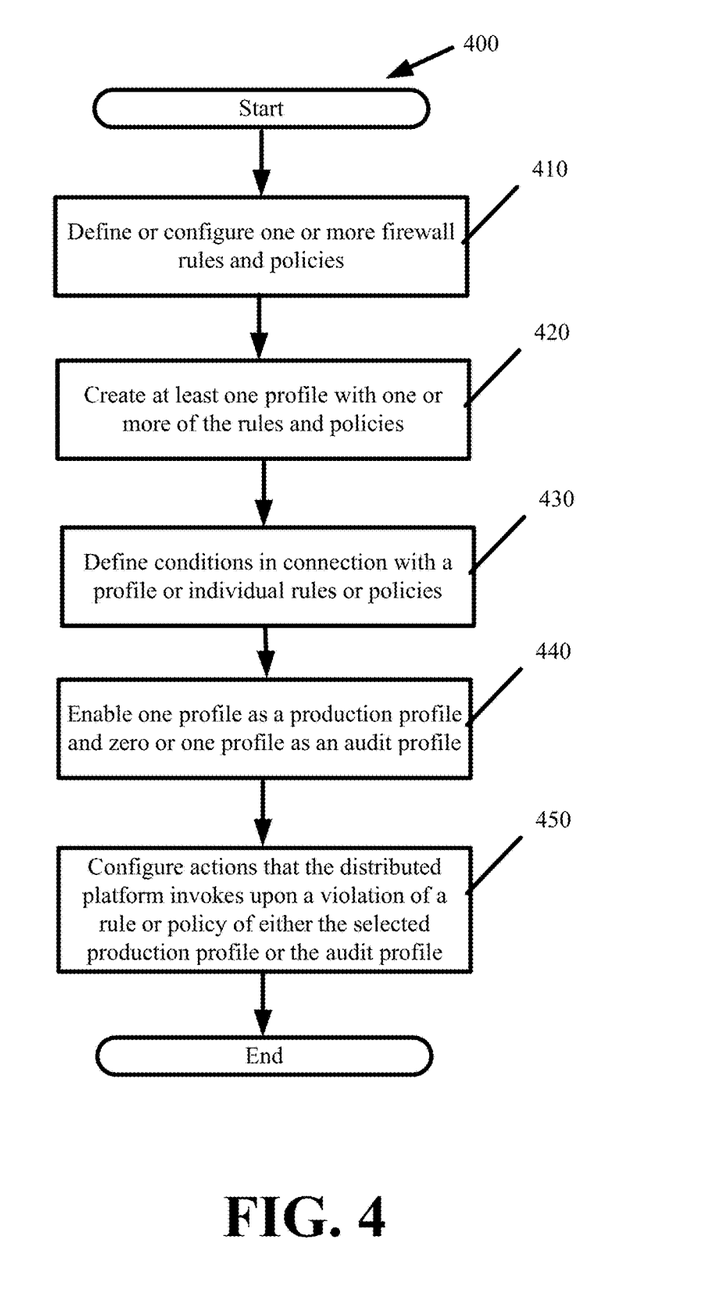
FIG. 4 illustrates a process for defining a WAF instance for a particular customer in accordance with some embodiments.

FIG. 4 illustrates a process 400 for defining a WAF instance for a particular customer in accordance with some embodiments. Process 400 can be used to create a new WAF instance or update an existing WAF instance of the particular customer.

The process 400 first involves defining (at 410) or configuring one or more firewall rules and policies. Each rule or policy defines expressions, formatting, conditions, or values for identifying one or more malicious attacks that a customer wants the distributed platform WAF to detect and take action against. Two or more rules can be grouped to create a rule set.

Each rule set contains one or more rules that identify specific types of threats within application layer traffic. Each rule set contains various threat detection categories. Each of the categories contains a set of rules that define how threats to site traffic will be detected. Each rule defines the directive or regular expression used to identify a specific threat. Policies can be specified according to access controls and global settings as some examples.

The threat detection categories of a rule set can include cross-site scripting attacks, protocol violations, correlation, Trojans, tight security, HTTP policy, protocol anomalies, request limits, common exceptions, generic attacks, Structured Query Language (SQL) injection attacks, and bad robots as some examples. The cross-site scripting attack category specifies rules that detect the addition of an unauthorized client-side script to a site. The protocol violations category detects violations of the HTTP protocol, such as URL encoding abuse, missing/duplicate/conflicting headers, and invalid characters as some examples. The correlation category provides threshold based threat detection. The Trojan category detects access to Trojans that have already made their way into a server. The tight security category detects path traversal attacks whereby attackers attempt to gain unauthorized access to a private location on a server. The HTTP policy category determines whether traffic matches the delivery profile defined by the global settings that define the Internet media type, HTTP methods or protocols, file name extensions, and request headers. The protocol anomalies category detects protocol anomalies including empty or missing header data. The request limits category determines whether traffic must match the delivery profile defined by the global settings that define query string and file size limitations. The generic attacks category detects common application security attacks including session fixation and Lightweight Directory Access Protocol (LDAP) injection attacks. The SQL injection attacks category detects a variety of different methods for initiating an SQL attack. The bad robots category detects known bad robots.

Some embodiments provide predefined rule sets that the customer can adopt. An example of a predefined rule set is the Open Web Application Security Project (OWASP) Mod-Security core rule set (CRS). The OWASP CRS provides generic protection from unknown vulnerabilities often found in web applications by inspecting HTTP data for malicious payloads. The benefit of adopting a predefined rule set is that whenever that rule set is updated, the customer WAF instance adopting the predefined rule set will automatically receive the updated rules or policies. In this manner, the customer can obtain protections from new attacks without having to manually specify rules or policies to protect against the new attacks.

In some embodiments, customers can enable and disable individual rules or threat detection categories of a rule set. In some embodiments, customers can modify various rules of predefined rule sets to customize them for the particular customer's needs.

Figure 5:
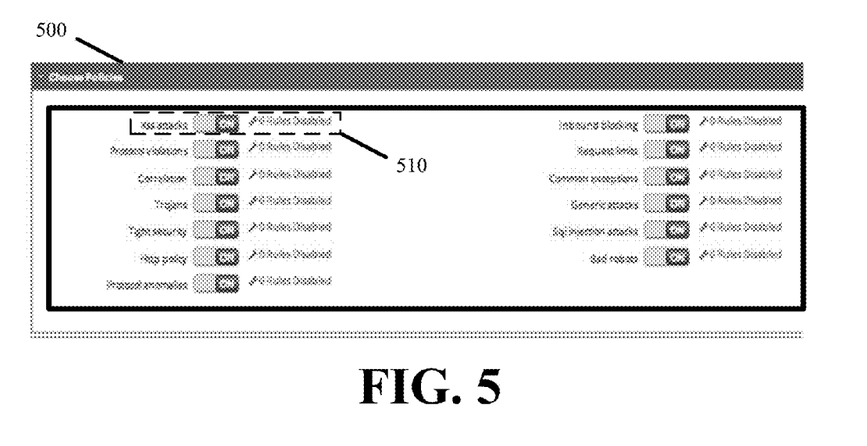
FIG. 5 illustrates an interactive interface provided by the portal of some embodiments for enabling and disabling each threat detection category from a rule set individually.
Figure 6:
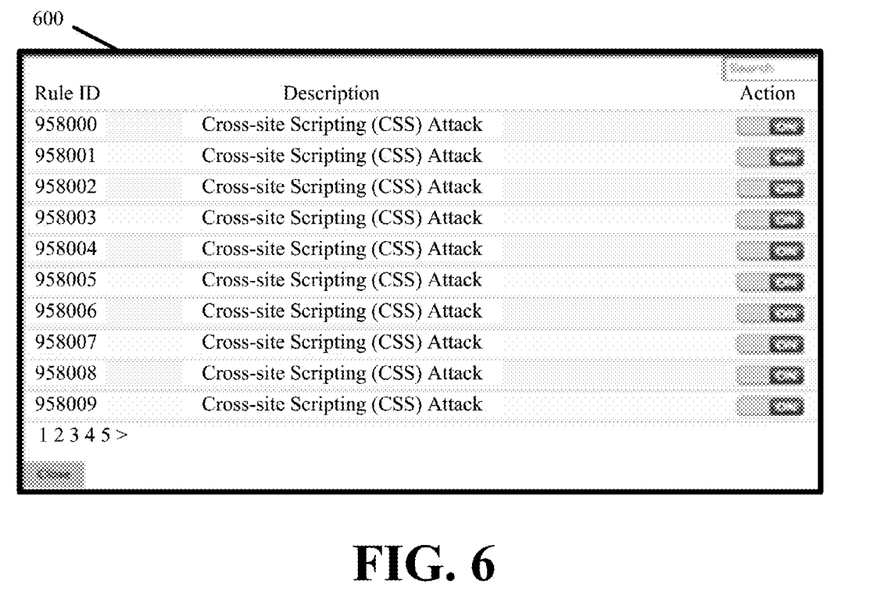
FIG. 6 presents an interface for enabling and disabling individual rules associated with the cross-scripting attack category in accordance with some embodiments.

FIG. 5 illustrates an interactive interface 500 provided by the portal of some embodiments for enabling and disabling each threat detection category from a rule set individually. The one or more rules associated with a threat detection category can also be enabled and disabled individually. For example, selection of interface element 510 provides access to the interface of FIG. 6. FIG. 6 presents an interface 600 for enabling and disabling individual rules associated with the cross-scripting attack category in accordance with some embodiments. Some embodiments also allow customers to create their own proprietary rule set or specify new rules using regular expressions or conditional statements.

The profile access controls identify IP addresses, countries, URLs, and referrers to whitelist or blacklist. In other words, the access controls can be used to identify safe inbound messages from malicious inbound messages based on IP addressing (i.e., IPv4 or IPv6) of the requestor or sender of the inbound message, country from which a request or inbound message originates, matching URL fragment of the request or inbound message, or referrer. The whitelists identify safe or non-malicious traffic, whereas the blacklists identify traffic that potentially harbors a malicious attack or traffic that should be restricted for other reasons.

Figure 7:
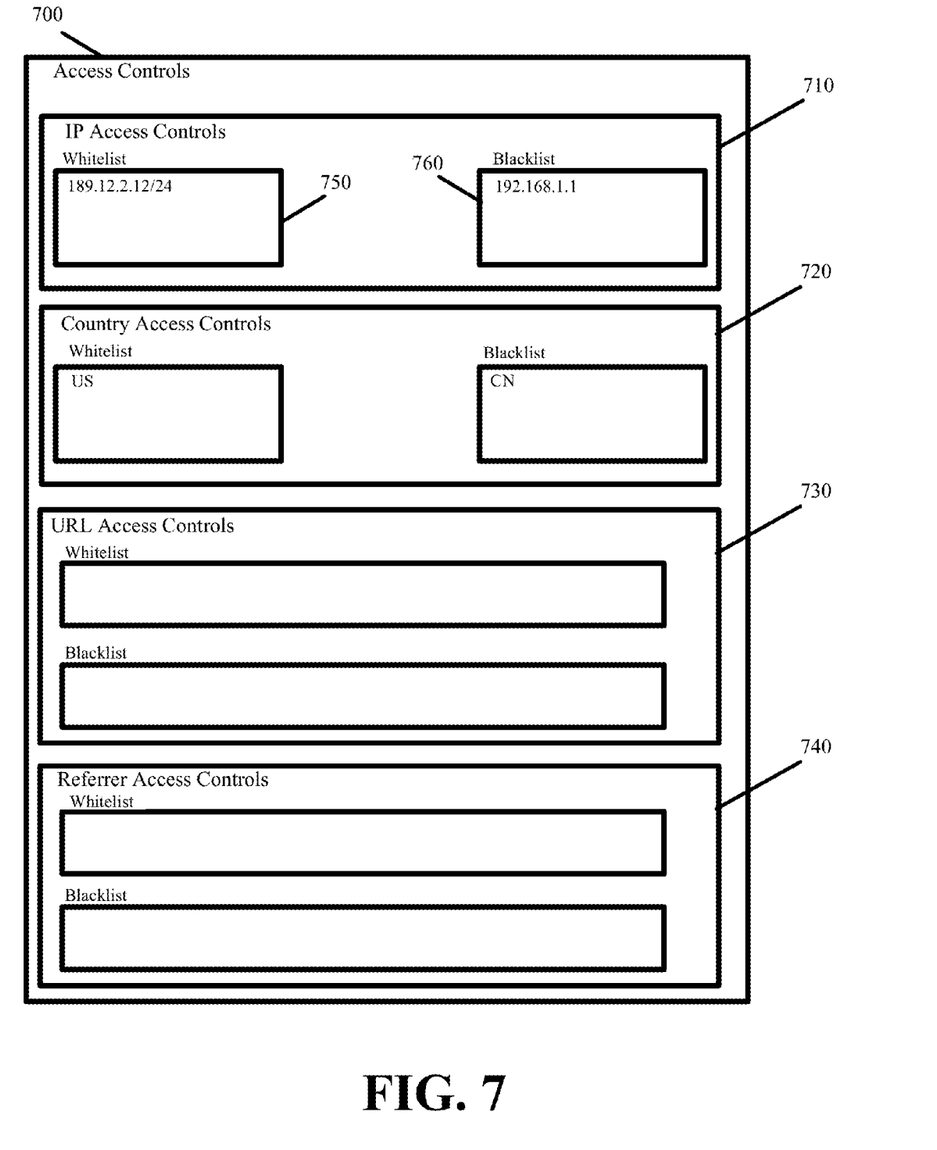
FIG. 7 illustrates an interface for specifying access controls in accordance with some embodiments.

FIG. 7 illustrates an interface 700 for specifying access controls in accordance with some embodiments. The interface 700 includes whitelist and blacklist fields for specifying IP access controls 710, country access controls 720, URL access controls 730, and referrer access controls 740. The IP access control whitelist field 750 includes an address subnet that is considered a source of legitimate traffic and any traffic sent from users in that subnet is allowed to pass through the distributed platform's firewall protections. The IP access control blacklist field 760 includes a specific IP address that is considered a source of illegitimate traffic and any traffic sent from a user with that specific IP address will be screened according to an action that is configured for that policy.

Figure 8:
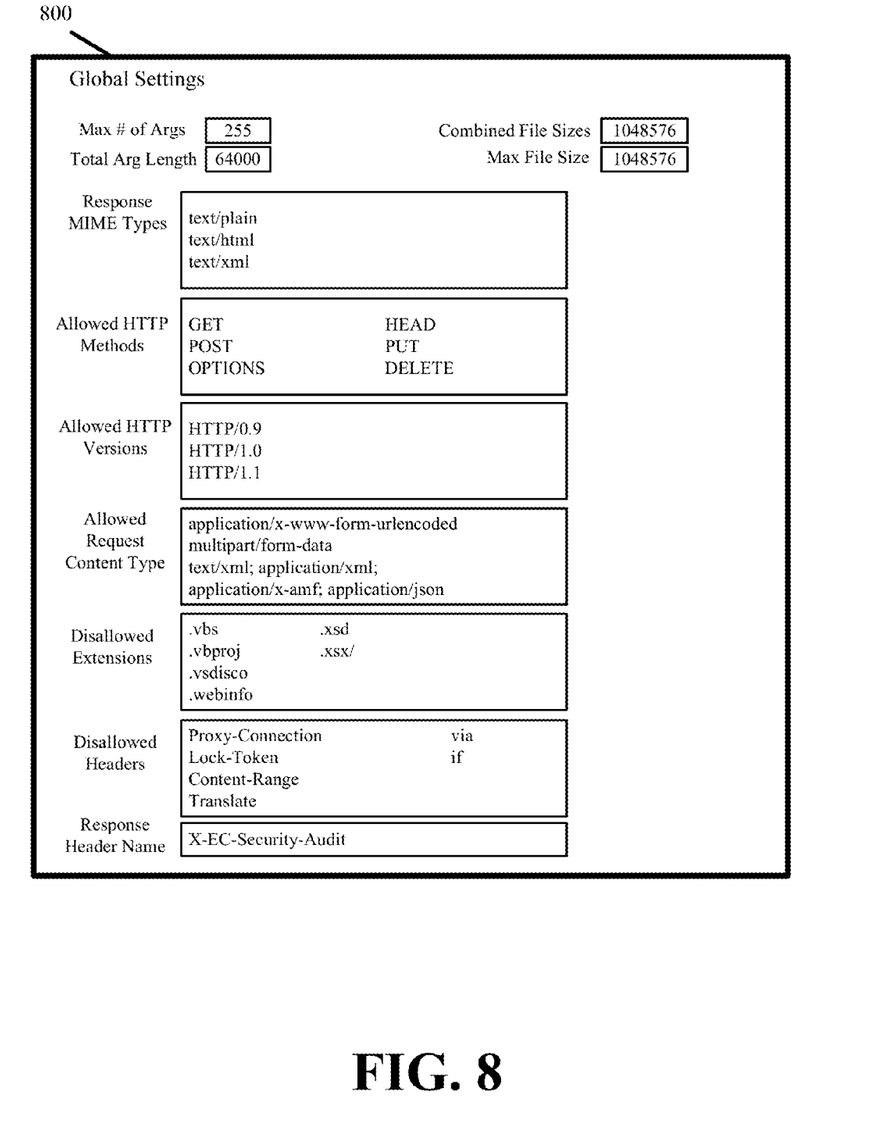
FIG. 8 illustrates an interface for specifying global settings in accordance with some embodiments.

The profile global settings define the properties for safe inbound messages. Traffic that does not have the defined properties is considered to be unwanted traffic and should be screened according to an action that is configured for the global settings. The global settings distinguish legitimate traffic from illegitimate traffic on the basis of any one or more of a file name extension, file size, request header, HTTP method, HTTP version, Internet media type, and query string values or parameters. More specifically, traffic can be differentiated on the basis of the file name extension of inbound requests and other inbound traffic, a maximum file size, in bytes, for a POST request or for multiple combined messages, the name of the response header included with a response, an enumeration of approved and/or rejected HTTP methods (e.g., GET and POST), an enumeration of approved and/or rejected HTTP versions (e.g., HTTP/1.1), and an enumeration of approved and/or rejected Internet media types (e.g., image/png). Restrictions on the maximum number of characters for a query string value, maximum number of parameters that a query string may contain, maximum number of characters for any single query string parameter value, or maximum number of characters for any single query string parameter name can also be used as global settings for differentiating between legitimate traffic and illegitimate traffic. FIG. 8 illustrates an interface 800 for specifying global settings in accordance with some embodiments.

With reference back to process 400, the next step in defining a WAF instance is the creation of (at 420) one or more profiles. Each profile is a grouping of some set of rules and policies. Accordingly, the customer selects or associates one or more of the defined rules, rule sets, access controls, and global settings as a profile. The same rules and policies can be associated with different profiles. Each profile can be named so that it can be easily associated or disassociated with the customer WAF instance. A profile therefore defines a collective set of threat detection measures that may define any of the properties for legitimate traffic or illegitimate traffic.

In some embodiments, customers are provided granular control over how the distributed platform servers apply the profiles and individual rules or policies thereof. The granular control stems from the definition (at 430) of conditions in connection with a profile or individual rules or policies. A condition defined in connection with a specific rule controls how a distributed platform server enforces the specific rule against inbound traffic. Specifically, a condition defined in connection with a specific rule can cause a server to enforce the specific rule against all inbound traffic or restrict enforcement of the specific rule to traffic that is from a specific Autonomous System, origin, IP address, country, device type, or referring domain. Conditions can also be specified to restrict enforcement on the basis of certain cookies or cookie parameters, request method type, request scheme, URL path directory, URL path extension, URL path filename, URL query string, and regular expressions in the header, URL path, and URL query string as some examples.

The customer WAF instance definition continues by enabling (at 440) one profile as a production profile and zero or one profile as an audit profile. The profile selected as the production profile contains the rules and policies that the distributed platform enforces to protect the particular customer's assets across the distributed platform. The profile selected as the audit profile contains the rules and policies that the distributed platform will test alongside the production profile. As earlier noted, the distributed platform passes the same inbound traffic that is secured using the production profile rules and policies to the rules and profiles of the audit profile. In this manner, the particular customer can test new rules and policies prior to deploying them as part of the production profile and can perform the tests without compromising existing security offered by the production profile.

The process then configures (at 450) actions that the distributed platform invokes upon a violation of a rule or policy of either the selected production profile or the audit profile. The actions control how data that is found to violate the rules and policies of the production and audit profiles is handled. As previously noted, the specified actions can include proactive and/or reactive actions. A proactive action actively protects customer assets by blocking or restricting data that is found to violate one or more of the defined rules and policies. A reactive action generates an alert or otherwise logs a rule or policy violation. The production profile can be defined with either proactive or reactive actions. Since the audit profile compliments the production profile by providing the ability to test rules and policies alongside the production profile rules and policies, the audit profile is configured with one or more reactive actions. The alerts can be configured to identify the specific rule or policy that is violated and the data that caused the violation including various identifying information that can be extracted from the data (e.g., IP address of the sender, header parameters, etc.). In some embodiments, the same action or actions are implemented for all rule and policy violations of a particular profile. In some other embodiments, users can specify different actions for any one or more rules or policies (i.e., access control or global setting) of a profile.

As noted above, once the particular WAF instance is defined, the particular WAF instance is passed to the distributed platform configuration repository along with an identifier for the particular customer that created the WAF instance. The particular customer's WAF instance is then incorporated as part of the operational configurations of the distributed platform servers and used to update the firewall function of those servers in real-time. Specifically, the servers retrieve the updated operational configurations containing the particular WAF instance from the repository and then update their own operation as per the updated operational configurations.

In addition to the proactive and reactive actions defined in the different customer WAF instances, the distributed platform servers that provide the WAF functionality according to the different customer WAF instances also perform a logging function. The logging function is used to monitor the firewall function across the distributed platform as well as facilitate firewall reporting and alerting. When a server encounters data that violates a rule or policy of a customer WAF instance, the server enters the violation to a local log with a set of identifying information related to the violation.

The log entry includes one or more of the following fields: rule message, rule identifier, instance identifier, instance name, profile type, country code, action type, client IP address, URL, referrer, user agent, rule tags, matched on, and matched value. The rule message provides a description of the rule or policy that was violated. The rule identifier indicates the identifier for the rule or policy that was violated. The instance identifier and name indicate the identifier and name for the instance that activated the profile containing the rule or policy that was violated. The profile type indicates whether the violating data was screened using the production profile or audit profile of a customer WAF instance. The country code identifies the country or region from which the violating data originates. The action type indicates the type of action that was taken in response to the rule or policy violation. The client IP address identifies the IP address for the client or user that originates the violating data. The URL is the URL of the violating data and the referrer indicates the data's referrer as defined by the referrer request header field. The user agent indicates the user agent that submitted the violating data. The rule tags indicate whether a threat detection category, access control, or global setting was violated. The matched on indicates a variable that identifies where the violation was found and the matched value indicates the value that triggered the rule or policy violation.

The WAF SOC periodically compiles the various server logs. The WAF SOC then processes the compiled logs in order to create customer reports. Each customer report details any and all violations of a particular customer WAF instance that occur anywhere across the distributed platform. The WAF SOC provides an interface with which a customer can view the report for the performance of that customer's WAF instance.

Figure 9:
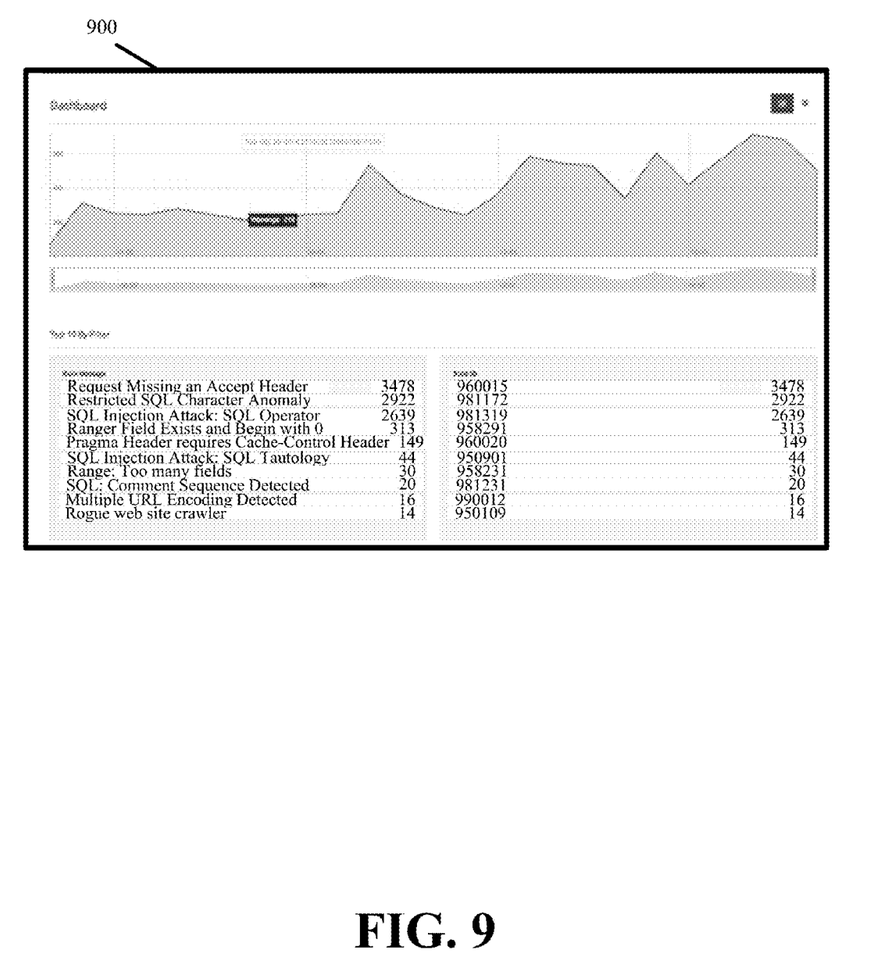
FIG. 9 illustrates an exemplary interface identifying a report for the performance of a particular customer WAF instance.

FIG. 9 illustrates an exemplary interface 900 identifying a report for the performance of a particular customer WAF instance. The interface 900 illustrates the number of rule and policy violations of the particular customer WAF instance that occur across the distributed platform over time. The interface 900 further identifies the most common violations and the identifier for the rule that was most often violated. Customers can drill-down to view detailed information about a specific violation.

Using the reports, customers can better understand how their assets are protected throughout the distributed platform. Customers can then more knowledgeably fine-tune their firewall configurations and specify or adjust rules and policies to stay ahead of new attacks or combat existing threats. More specifically, customers can define and test new rules and policies using the audit profile without compromising the integrity and protections offered by the rules and policies production profile. Should the audit profile rules and policies prove effective against new or previously undetected attacks, the customer can quickly and easily incorporate those rules and policies from the audit profile into the production profile, thereby causing the distributed platform servers to enforce those rules and policies when protecting the customer's assets from attack.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a hardware processor including cellular telephones, smartphones, portable digital assistants, tablet devices, laptops, notebooks, desktop computers, and networked computers. Examples of computer-readable media include, but are not limited to, CD-ROMs, flash drives, RAM chips, hard drives, EPROMs, etc.

Figure 10:
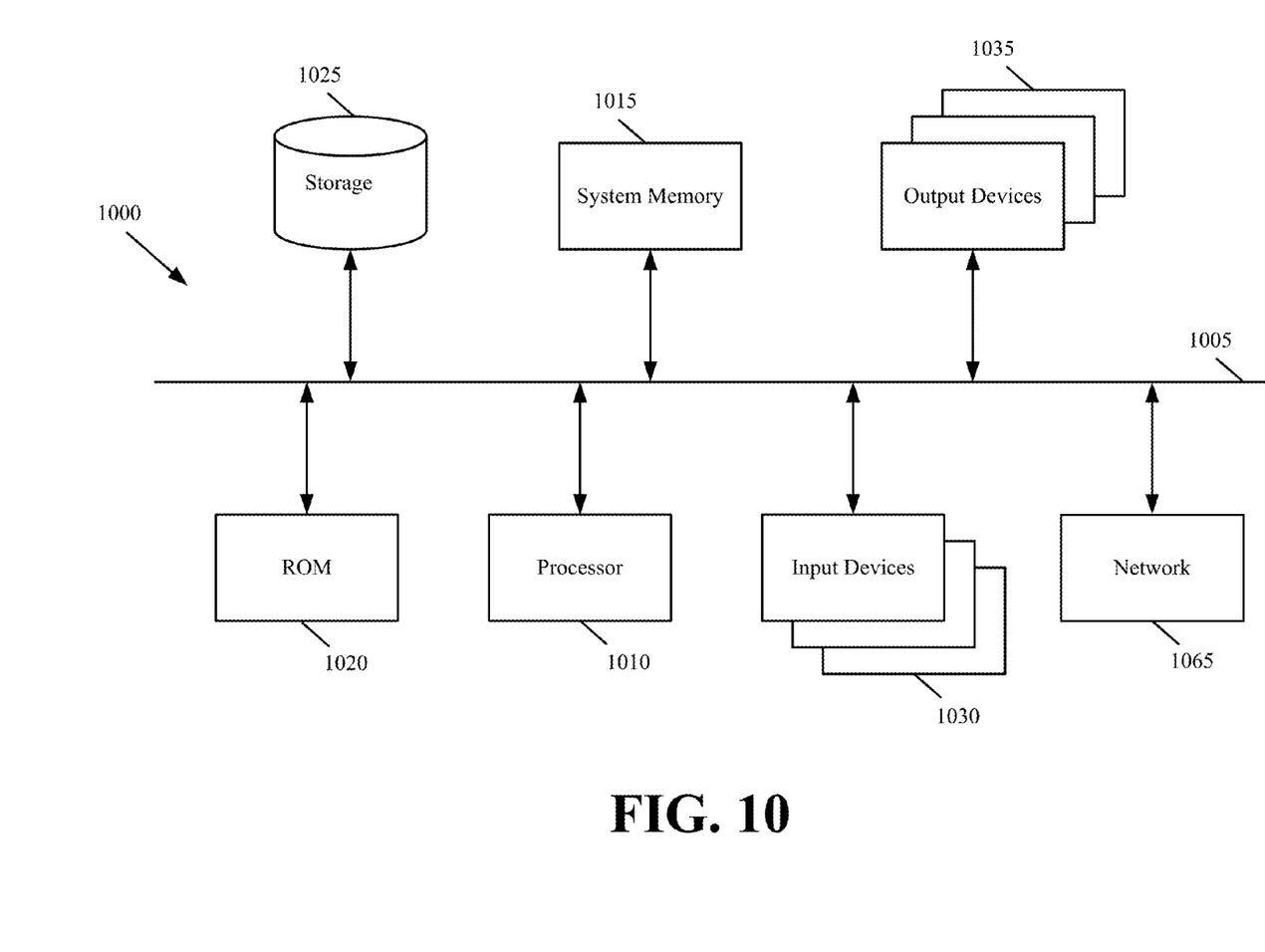
FIG. 10 illustrates a computer system or server with which some embodiments are implemented.

FIG. 10 illustrates a computer system or server with which some embodiments are implemented. Such a computer system includes various types of computer-readable mediums and interfaces for various other types of computer-readable mediums that implement the various methods and machines described above (e.g., distributed platform servers, WAF SOC, etc.). Computer system 1000 includes a bus 1005, a processor 1010, a system memory 1015, a read-only memory 1020, a permanent storage device 1025, input devices 1030, and output devices 1035.

The bus 1005 collectively represents all system, peripheral, and chipset buses that communicatively connect the numerous internal devices of the computer system 1000. For instance, the bus 1005 communicatively connects the processor 1010 with the read-only memory 1020, the system memory 1015, and the permanent storage device 1025. From these various memory units, the processor 1010 retrieves instructions to execute and data to process in order to execute the processes of the embodiments described above. The processor 1010 is a processing device such as a central processing unit, integrated circuit, graphical processing unit, etc.

The read-only-memory (ROM) 1020 stores static data and instructions that are needed by the processor 1010 and other modules of the computer system. The permanent storage device 1025, on the other hand, is a read-and-write memory device. This device is a non-volatile memory unit that stores instructions and data even when the computer system 1000 is off. Some embodiments use a mass-storage device (such as a magnetic, solid-state disk, or optical disk and its corresponding disk drive) as the permanent storage device 1025.

Other embodiments use a removable storage device (such as a flash drive or solid-state disk) as the permanent storage device. Like the permanent storage device 1025, the system memory 1015 is a read-and-write memory device. However, unlike storage device 1025, the system memory is a volatile read-and-write memory, such as random access memory (RAM). The system memory stores some of the instructions and data that the processor needs at runtime. In some embodiments, the processes are stored in the system memory 1015, the permanent storage device 1025, and/or the read-only memory 1020.

The bus 1005 also connects to the input and output devices 1030 and 1035. The input devices enable the user to communicate information and select commands to the computer system. The input devices 1030 include alphanumeric keypads (including physical keyboards and touchscreen keyboards), pointing devices (also called "cursor control devices"). The input devices 1030 also include audio input devices (e.g., microphones, MIDI musical instruments, etc.). The output devices 1035 display images generated by the computer system. The output devices include printers and display devices, such as liquid crystal displays (LCD).

Finally, as shown in FIG. 10, bus 1005 also couples computer 1000 to a network 1065 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1000 may include one or more of a variety of different computer-readable media. Some examples of such computer-readable media include RAM, ROM, compact discs (CD-ROM), digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
receiving an inbound message comprising a Uniform Resource Locator (URL) directed to a particular content provider from a plurality of content providers under protections of a firewall;
selecting at said firewall, a particular firewall configuration defined by the particular content provider from a plurality of firewall configurations defined by the plurality of content providers based on said URL directed to the particular content provider;
configuring active attack protections at the firewall based on a first set of firewall protections of the particular firewall configuration defined by the particular content provider and attack protections under test at the firewall based on a different second set of firewall protections of the particular firewall configuration defined by the particular content provider;
replicating the inbound message, wherein said replicating produces at the firewall a first copy and a second copy of the inbound message;
protecting the particular content provider from attacks in the inbound message violating the first set of firewall protections set as the active attack protections while contemporaneously testing the second set of firewall protections set as the attack protections under test against the second copy of the inbound message resulting from said replicating; and
swapping the active attack protections with the attack protections under test in response to input from the particular content provider, wherein said swapping comprises protecting the particular content provider from attacks in subsequent messaging violating the second set of firewall protections set as the active attack protections while contemporaneously testing the first set of firewall protections set as the attack protections under test against copies of said subsequent messaging.

2. The method of claim 1 further comprising alerting the particular content provider of a first attack in the inbound message without blocking said inbound message as a result of the first attack violating at least one firewall protection of the second set of firewall protections set as the attack protections under test and not violating any firewall protection of the first set of firewall protections set as the active attack protections.

3. The method of claim 2 further comprising blocking the inbound message at the firewall as a result of a second attack in the first copy of the inbound message violating at least one firewall protection of the first set of firewall protections set as the active attack protections.

4. The method of claim 1 further comprising reconfiguring the firewall according to a third set of firewall protections defined by a different second content provider in response to a second inbound message comprising a different URL directed to a different second content provider of the plurality of content providers under protections of the firewall.

5. The method of claim 1 further comprising serving content of the particular content provider through the firewall in response to the inbound message omitting an attack protected against by the first set of firewall protections.

6. The method of claim 1, wherein said swapping comprises reconfiguring the firewall with the second set of firewall protections set as the active attack protections and the first set of firewall protections set as the attack protections under test.

7. The method of claim 1, wherein configuring the firewall comprises configuring a plurality of servers of a content delivery network (CDN) at different geographic points-of-present (PoPs) of the CDN with the first and second sets of firewall protections in response to receiving said inbound message at each of the different PoPs.

8. The method of claim 7 further comprising propagating the first and second set of firewall protections across the different PoPs of the CDNs in response to an update to or definition of the first and second sets of firewall protections by the particular content provider.

9. The method of claim 8, wherein said propagating comprises receiving the first and second sets of firewall protections from the particular content provider at a security operations center of the CDN in advance of said propagating.

10. A method for customizing firewall protections based on implicated content provider content, the method comprising:
receiving at a particular server, a first request comprising a first Uniform Resource Locator (URL), the first URL comprising a link to content of a first content provider;
reconfiguring the particular server with a first set of firewall protections associated with the first URL;
protecting the first content provider at the particular server from a first attack embedded in the first request using the first set of firewall protections;
receiving at the particular server, a second request comprising a second URL, the second URL comprising a link to content of a second content provider;
reconfiguring the particular server from the first set of firewall protections to a second set of firewall protections associated with the second URL in response to receiving the second URL, wherein the first set of firewall protections are defined by the first content provider and the second set of firewall protections are defined by the second content provider;
protecting the second content provider at the particular server from a different second attack embedded in the second request using the second set of firewall protections;
detecting at the particular server, a new attack affecting the plurality of content providers; and
modifying the first and second sets of firewall protections in response to said detecting, wherein said modifying comprises inserting a new firewall protection protecting against the new attack in each of the first and second sets of firewall protections of the first and second content providers without action by the first and second content providers, wherein said modifying automatically enforces the new firewall protection as part of said protecting the first content provider and as part of said protecting the second content provider.

11. The method of claim 10 further comprising receiving at the particular server, a plurality of different sets of firewall protections from a plurality of content providers, wherein the plurality of different sets of firewall protections comprises the first and second sets of firewall protections.

12. The method of claim 11 further comprising linking each set of firewall protections from the plurality of different sets of firewall protections with a different URL associated with requesting a content or service from different content providers of the plurality of content providers.

13. The method of claim 12 further comprising customizing the plurality of different sets of firewall protections based on new rules or policies defined by the plurality of content providers.

14. The method of claim 10 further comprising serving the content of the first content provider from the particular server in response to a third request that does not violate the first set of firewall protections and serving the content of the second content provider from the particular server in response to a fourth request that does not violate the second set of firewall protections.

15. The method of claim 10, wherein protecting the first content provider comprises blocking a first set of requests harboring a first set of attacks detected by the first set of firewall protections at the particular server and permitting a second set of requests harboring at least one attack detected by the second set of firewall protections and not by the first set of firewall protections, and wherein the first and second sets of requests are directed to content of the first content provider.

16. A method comprising:
    propagating a plurality of firewall configurations across a plurality of content delivery servers, each firewall configuration of the plurality of firewall configurations comprising a different set of rules and policies protecting content of a different content provider;
    receiving an inbound message directed to a particular content provider at a particular content delivery server of the plurality of content delivery servers;
    screening the inbound message at the particular content delivery server against an active profile of a particular firewall configuration from the plurality of firewall configurations based on an identifier within the inbound message identifying the particular content provider while simultaneously testing the inbound message against a test profile of the particular firewall configuration, wherein the particular firewall configuration is defined by the particular content provider;
    providing a response to said inbound message as a result of said inbound message passing the set of rules and policies of the active profile of the particular firewall configuration during said screening, wherein providing the response comprises passing content of the particular content provider from the particular content delivery server to a client submitting said inbound message, and wherein providing the response further comprises alerting the particular content provider in response to said inbound message violating at least one of a set of rules and polices of the test profile of the particular firewall configuration; and
    blocking the inbound message at the particular content delivery server in response to said inbound message violating at least one of the set of rules and policies of the active profile of the particular configuration during said screening.

17. The method of claim 16 further comprising detecting a new attack impacting a plurality of content providers.

18. The method of claim 17 further comprising inserting a new rule or policy protecting against said new attack in each firewall configuration of the plurality of content providers from the plurality of firewall configurations, wherein said inserting comprises propagating updated firewall configurations across the plurality of content delivery servers.

19. The method of claim 16, wherein the particular firewall configuration comprises a first set of rules and policies actively protecting content of the particular content provider and a different second test set of rules and policies, and wherein providing the response comprises alerting the particular content provider in response to the inbound message violating a rule or policy from the second test set of rules and policies while passing the first set of rules and policies of the particular firewall configuration.

* * * * *